US012590023B2

(12) United States Patent
Tanzer et al.

(10) Patent No.: US 12,590,023 B2
(45) Date of Patent: Mar. 31, 2026

(54) METHOD FOR REGULATING THE ADDITION OF A FLOCCULANT TO A SLUDGE

(71) Applicant: ANDRITZ AG, Graz (AT)

(72) Inventors: Alexander Tanzer, Graz (AT); Christoph Spielmann, Hitzendorf (AT)

(73) Assignee: ANDRITZ AG, Graz (AT)

( * ) Notice: Subject to any disclaimer, the term of this patent is extended or adjusted under 35 U.S.C. 154(b) by 361 days.

(21) Appl. No.: 18/570,954

(22) PCT Filed: Mar. 9, 2022

(86) PCT No.: PCT/EP2022/055973
§ 371 (c)(1),
(2) Date: Dec. 15, 2023

(87) PCT Pub. No.: WO2022/263020
PCT Pub. Date: Dec. 22, 2022

(65) Prior Publication Data

US 2024/0383790 A1 Nov. 21, 2024

(30) Foreign Application Priority Data

Jun. 18, 2021 (AT) .............................. A 50492/2021

(51) Int. Cl.
| | |
|---|---|
| *C02F 11/14* | (2019.01) |
| *C02F 1/52* | (2023.01) |
| *C02F 11/00* | (2006.01) |
| *C02F 11/12* | (2019.01) |
| *G06T 7/11* | (2017.01) |
| *G06V 10/764* | (2022.01) |

(52) U.S. Cl.
CPC ............ *C02F 11/14* (2013.01); *C02F 1/5209* (2013.01); *C02F 11/00* (2013.01); *C02F 11/002* (2013.01); *C02F 11/12* (2013.01); *G06T 7/11* (2017.01); *G06V 10/764* (2022.01); *C02F 2209/001* (2013.01); *C02F 2209/006* (2013.01); *G06T 2207/20* (2013.01); *G06T 2207/20021* (2013.01); *G06T 2207/20081* (2013.01)

(58) Field of Classification Search
CPC ...... C02F 1/5209; C02F 11/00; C02F 11/002; C02F 11/12; C02F 11/14; C02F 2209/001; C02F 2209/006; G06T 7/11; G06T 2207/20; G06T 2207/20021; G06T 2207/20081; G06V 10/764
See application file for complete search history.

(56) References Cited

U.S. PATENT DOCUMENTS

| | | |
|---|---|---|
| 5,380,440 A | 1/1995 | Chipps |
| 10,329,176 B2 | 6/2019 | Hochegger et al. |

FOREIGN PATENT DOCUMENTS

| | | |
|---|---|---|
| KR | 20130033148 A | 4/2013 |

OTHER PUBLICATIONS

English translation of KR 10-2013-0033148 A (2013).*
Khan et al., Environmental Protection Engineering, vol. 46, No. 3, pp. 17-37 (2020).*
International Preliminary Report on Patentability dated Oct. 2, 2023 for International Patent Application No. PCT/EP2022/055973.
International Search Report for International Patent Application No. PCT/EP2022/055973 mailed Jul. 13, 2022.

* cited by examiner

*Primary Examiner* — John Kim
(74) *Attorney, Agent, or Firm* — Alix, Yale & Ristas, LLP

(57) ABSTRACT

The invention relates to a method for controlling the addition of a flocculant to a sludge, wherein the sludge is dewatered and images are made of the dewatered sludge and/or the dewatered liquid with a camera system. It is characterised in that the images are evaluated with a computer-implemented computational model that has previously been trained with a training data set, whereby the computational model divides the images into sub-images, classifies them and thus assesses the dewatering of the sludge. Optimal dewatering is achieved with improved ecological and economic efficiency.

20 Claims, 5 Drawing Sheets

1

2

3

4

4

4

6

METHOD FOR REGULATING THE ADDITION OF A FLOCCULANT TO A SLUDGE

BACKGROUND

The disclosed embodiments relate to a method for controlling the addition of a flocculant to a sludge, wherein the flocculant is added to the sludge and the sludge is subsequently at least partially dewatered in a dewatering device, for example a dewatering screw, a decanter, a wire dewatering device, etc., wherein images of the dewatered sludge and/or of the liquid dewatered from the sludge are produced with a camera system. The disclosure also relates to a dewatering device for sludge with a camera system and a computer program product.

Sludge refers to solid matter dispersed in a liquid, whereby the solid matter is typically finely dispersed and very fine-grained and the amount of liquid relative to the amount of solid matter is comparatively small. Technical processes are often aimed at further dewatering the sludge to increase the solids content. Usually, a flocculant, typically a polymer, is added to the sludge and further dewatering occurs. The flocculant causes flocculation, i.e. the fine-grained solid is aggregated into larger flakes, which advantageously allows separation of the liquid from the flakes. The dosage of flocculant for optimal flocculation depends on many sludge parameters, such as the particle size distribution of the solids and especially the nature of the solids (i.e. whether they are mineral, fibrous, or biological in nature). If less than the optimum amount of flocculant is added, less flocculation will be achieved, i.e. fine-grained, non-flocculated solids will remain in the liquid, resulting in less than optimum dewatering. Conversely, adding more than the optimum amount of flocculant will not result in higher than optimum dewatering. This may even lead to a deterioration of the dewatering process. Another complicating factor is that the achievable dewatering, and thus the dryness of the sludge, is not a fixed, given target value, but is itself highly dependent on the parameters of the sludge. This means that controlling according to the dry content of the sludge is difficult. In the current state of the art, flocculant is often dosed by the operator on a subjective basis, with a tendency to overdose in the interest of safe operation. In general, the use of flocculants is costly. Efficient use is therefore desirable, although overdosing of flocculants should be avoided for ecological reasons.

For example, EP3134354 B1 discloses a process for dewatering sludge on a wire. According to the process, the sludge is necessarily guided on a wire, which is cleaned by washing nozzles before an inflow area, whereby the flow behaviour of the sludge and the free wire surface are visually recorded in a control zone. This method thus requires the presence of a wire, a wire conditioning as well as the detection of the free wire surface and thus the detection of properties dissociated from the actual sludge.

KR20130033148A discloses a method and system for dewatering with control of flocculant dosage using a camera system to take images of sludge agglomerated in a sedimentation tank. To analyse sludge properties and determine flocculant dosage, the images are compared with previously stored reference images.

U.S. Pat. No. 5,380,440A describes a device and method for dewatering a sludge, wherein images of the dewatered sludge are recorded with a video camera after filtration. The images are compared with images representative of preferred dewatering to assess the moisture content of the dewatered sludge.

SUMMARY

Provided herein is a method of controlling the flocculant dosage to a sludge, the control being carried out according to objective criteria by evaluating the sludge and allowing the greatest possible ecological and economic efficiency.

As disclosed herein, this is achieved that the images of the dewatered sludge and/or of the liquid dewatered from the sludge are evaluated with a computer-implemented computational model for image analysis, the computational model was previously trained with a training data set, the training data set comprises on the one hand training images of dewatered sludge and/or of the liquid dewatered from the sludge as well as the training sub-images formed from the individual training images by subdivision and the classification of the individual training sub-images, wherein the computational model subdivides the individual images into sub-images, classifies the sub-images of the individual image and assesses the dewatering of the sludge on the basis of the classification, wherein the control of the flocculant dosage takes place on the basis of the assessment of the dewatering of the sludge. Images of the dewatered sludge and/or of the liquid dewatered from the sludge are created with the camera system and the images are evaluated with a computer-implemented computational model for image analysis, for example an artificial neural network running on an ordinary industrial PC. The individual images are first divided into sub-images for evaluation, whereby a classification of the individual sub-images is carried out by the calculation model. Thus, based on the classification of the individual sub-images of an image, the dewatering of the sludge is assessed. In particular, the image is not classified as such, e.g. by comparing the image with training images. With regard to the subdivision of the images into sub-images, it should be noted that the sub-images should be as small as possible, whereby the size of the sub-images should be at least large enough to allow conclusions to be drawn about the surface texture, in particular the granulation, the relief or the cracks, of the dewatered sludge or about the bubbles or foam formation of the dewatered liquid. An evaluation on the basis of a single pixel of the sub-image is therefore not possible, as this does not allow any conclusions to be drawn about the texture, for example. It is particularly beneficial if an optimal subdivision is identified based on the training images. For this purpose, training images with distinctive surface texture, granulation, relief and cracks or bubbles and foaming are identified first. Afterwards, the subdivision of these training images is progressively increased, thus reducing the size of the sub-images. The increasing subdivision is followed as long as the sub-images still show the distinctive texture, granulation, crack etc. or parts of it. This identification of the optimal subdivision is done, for example, by a trainer of the computational model and is particularly efficient. It is also conceivable to identify the optimal subdivision during training by means of the computational model itself, although this would require a great deal of computation and resources. Unexpectedly, the evaluation and classification of the sub-images provides better information with much less computational effort and fewer demands on the computer equipment used than would be possible with a comparison based on the individual images. Further advantages result from the generation of the training data set. Thus, even a few training images are sufficient, as the subdivision provides a multiple of training sub-images from the training images. In particular, the classification of the training sub-images can be done efficiently because the training image as such is assigned to a class, and the training sub-images obtained by subdivision essentially inherit the class of the training image. Advantageously, the subdivision of the images into sub-images is done analogously to the subdivision of the training images into training sub-images. It is also advantageous that the images are produced in the same way as the training images, e.g. with regard to the arrangement or the chosen perspective of the camera system on the dewatered sludge or on the liquid dewatered from the sludge.

In an embodiment of the disclosed method, the computational model classifies the sub-images of the dewatered sludge according to a surface texture, in particular a granulation, a relief or cracks of the dewatered sludge. As noted, the computational model is previously trained with a training data set, whereby the training images are divided into training sub-images and the computational model is trained with the classified training sub-images. The subdivision of the training images into training sub-images is done in such a way that the training sub-images have the smallest possible size, whereby the size of the training sub-images is chosen at least large enough so that the sub-images reproduce the surface texture, in particular the granulation, the relief or cracks of the dewatered sludge. After the training of the computational model is completed, the images of the dewatered sludge are evaluated with the computer-implemented computational model for image analysis, whereby the computational model divides the individual images into sub-images, classifies them and thus assesses the dewatering of the sludge. If, in addition or alternatively, images of the liquid dewatered from the sludge are created, the computational model evaluates the sub-images created from the images for bubbles trapped in the liquid or a foam formed on the liquid and classifies the sub-images accordingly. Again, the sub-images created by the subdivision must be of sufficient size. Advantageously, the sub-images are supportingly evaluated according to colour properties, in particular a colour value, a colour saturation or a brightness value.

In a further advantageous embodiment of the method, the computer-implemented computational model classifies reduced sub-images, wherein the computational model has been trained with reduced training sub-images. Reduction of a sub-image is understood to be the averaging or combination of pixel information of a number of pixels. The reduced sub-images thus represent a mosaic form of the sub-images. Unexpectedly, it was found that despite the reduction, the sub-images still allow conclusions to be drawn about the surface texture, in particular the granulation, relief or cracks, of the dewatered sludge or about the bubbles or foam formation of the dewatered liquid, thus allowing successful classification with a further reduction in the computational and resource requirements.

An advantageous embodiment of the method consists of the classification of the sub-images comprising at least two classes, a first class representing too little dewatering or flocculant dosage and a second class representing too much dewatering or flocculant dosage. On the basis of the classified sub-images, the dewatering of the sludge is assessed. This classification into two classes—i.e. into too little or too much dewatering or flocculant dosage—corresponds to the concept of a two-point control. In this way, a state of optimum dewatering or flocculant dosage can be achieved, but according to the control concept, the control never comes to rest. Alternatively, the sub-images are classified into at least three classes. Thus, one class each represents satisfactory, too little, or too much dewatering or flocculant dosage. This corresponds to the concept of a three-point control, whereby no change is made to the amount of flocculant added to the sludge in the range of optimum dewatering or flocculant dosage, whereas if the dewatering or flocculant dosage is too low or too high, the amount of flocculant added to the sludge is increased or reduced. As a result, the control is more consistent. Advantageously, in the described embodiments, the distribution of the frequency of the classes of the sub-images of the image is used to assess the dewatering of the sludge. For example, the flocculant dosage can be controlled according to the most common class. It is advantageous, for example, to calculate the quotient of the frequencies of two classes, e.g. the classes for too little or too much dewatering, and then to evaluate the dewatering according to the quotient calculated in this way. By specifying an "optimum quotient" for optimum dewatering or flocculant dosage as a setpoint, the control system will consequently seek to set this "optimum quotient". The "optimum quotient" is known, for example, from training the computational model with training images or training sub-images that are classified to represent optimum dewatering. It is advantageous to introduce a further class for gathering sub-images, whereby invalid sub-images are assigned to this class. In this case, sub-images are considered invalid if no dewatered sludge and/or no liquid dewatered from the sludge is shown on the sub-images. For example, sub-images may primarily represent elements of the dewatering device, such as the screw of a dewatering or transport screw, or the wire of a wire dewatering device. These sub-images do not allow any conclusions to be drawn about dewatering or flocculant dosage, are excluded from further evaluation as invalid and are not included in the dewatering evaluation.

In an advantageous embodiment of the method, the generation of the training data set comprises setting a desired dewatering or flocculant dosage during operation of the dewatering device, wherein the training images of the thus dewatered sludge and/or liquid are classified as representing a satisfactory dewatering or flocculant dosage. Equally advantageously, after setting the desired dewatering or flocculant dosage during operation, the flocculant dosage is reduced and too little dewatering or flocculant dosage is set, or the flocculant dosage is increased and too much dewatering or flocculant dosage is set, whereby the corresponding training images are then classified as representing too little or too much dewatering or flocculant dosage. For example, at one operating point of the dewatering device, the flocculant dosage is determined by a valve position and satisfactory dewatering or flocculant dosage is achieved at a valve position of 45%. Reducing the valve position that determines the flocculant dosage to 40% or increasing the valve position to 50% will result in either too little or too much dewatering or flocculant dosage. The training images generated this way with optimal, too little, or too much dewatering or flocculant dosage are used to train the computational model after subdivision into training sub-images and corresponding classification. The described method for generating the training data set is characterised by its efficiency, as training images for the classes optimal, too little, or too much dewatering or flocculant dosage can be generated and classified in a short time. If necessary, e.g. because a different type of sludge needs to be dewatered, a new training data set can be created very quickly and the computer-implemented calculation model can be trained accordingly.

In another favourable embodiment of the method, the images of the dewatered sludge and/or of the dewatered liquid are made in an area comprising a boundary surface of the dewatering device, in particular a free wire surface of a wire on which the sludge is guided, for example in an edge region of the wire or in the wake after a barrier acting on a wire, a free surface of a dewatering or conveying screw or a wall which is in direct contact with the sludge or the dewatered liquid. Surprisingly, it was found that the optimally dewatered sludge in areas that included boundary surfaces had a particularly distinctive surface texture, especially granulation, relief, or cracks. Too little flocculant will result in smooth, mirror-like textures, while too much flocculant will result in coarse, matt textures. With regard to the dewatered liquid, striking turbidity, foam formation and deposits can be observed in areas containing boundary surfaces depending on the dewatering or the flocculant dosage.

Also disclosed herein is a dewatering device for sludge comprising a camera system and means suitable for carrying out the process according to the invention. Advantageously, the camera system comprises a digital camera and at least one illuminating means, whereby the digital camera is associated with an optical axis and the illuminating means are configured for illumination in the direction of the optical axis. The camera system may include a cover, the cover being located between the camera or digital camera and the dewatered sludge or dewatered liquid. The camera is surrounded by the illuminating means, which are also arranged between the cover and the dewatered sludge or dewatered liquid. The cover allows the camera or the illuminating means to be protected from dirt or condensation. Ideally, the at least one illuminating mean allows homogeneous illumination in direction of the optical axis, thus reducing or eliminating interference of ambient light.

Also disclosed is a computer program product comprising instructions which cause the disclosed device to carry out the embodiments of the disclosed method.

BRIEF DESCRIPTION OF THE DRAWINGS

The invention will now be described using the examples in the drawings.

DETAILED DESCRIPTION

Figure 1:
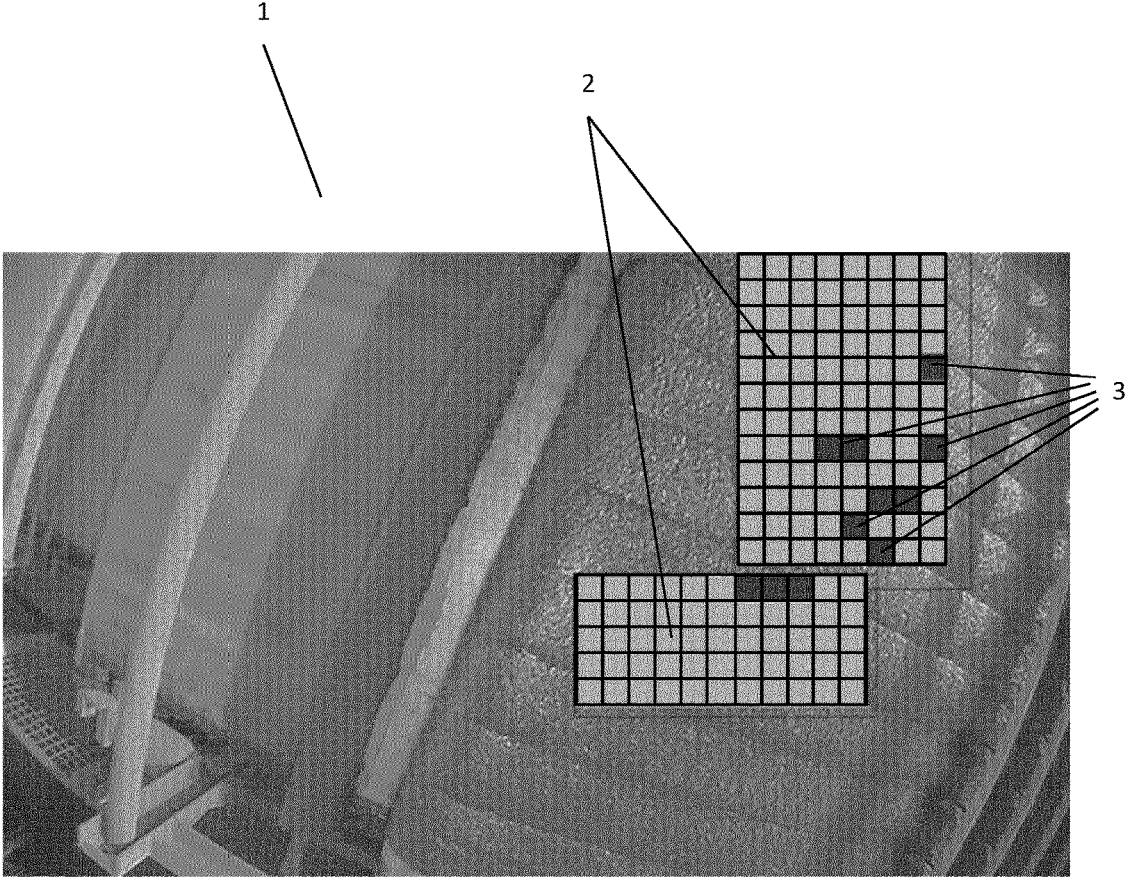
FIG. 1 shows images or sub-images of dewatered sludge in a dewatering device.

FIG. 1 shows images 2 and sub-images 3 of dewatered sludge in a dewatering device. In this process, the sludge is dewatered with the addition of a flocculant in a dewatering device designed as a wire dewatering system and images 2 are taken of the dewatered sludge using a camera system. FIG. 1 illustrates the relationship between image 2 and sub-image 3, whereby two images 2 are shown in FIG. 1. The respective image 2 is divided into sub-images 3 by the computer-implemented calculation model, whereby in FIG. 1 the respective sub-images 3 are shown as squares in the respective image 2. In general, the sub-images 3 should be as small as possible, whereby the size of the sub-images 3 is chosen at least large enough so that the sub-images 3 depict the surface texture, in particular the granulation, the relief or cracks of the dewatered sludge. The trained calculation model then classifies the sub-images, which is indicated in FIG. 1 by differently coloured sub-images 3 or squares. Here the distribution of the frequency of the classes of sub-images 3 can be used to assess the dewatering of the sludge.

Figure 2A:
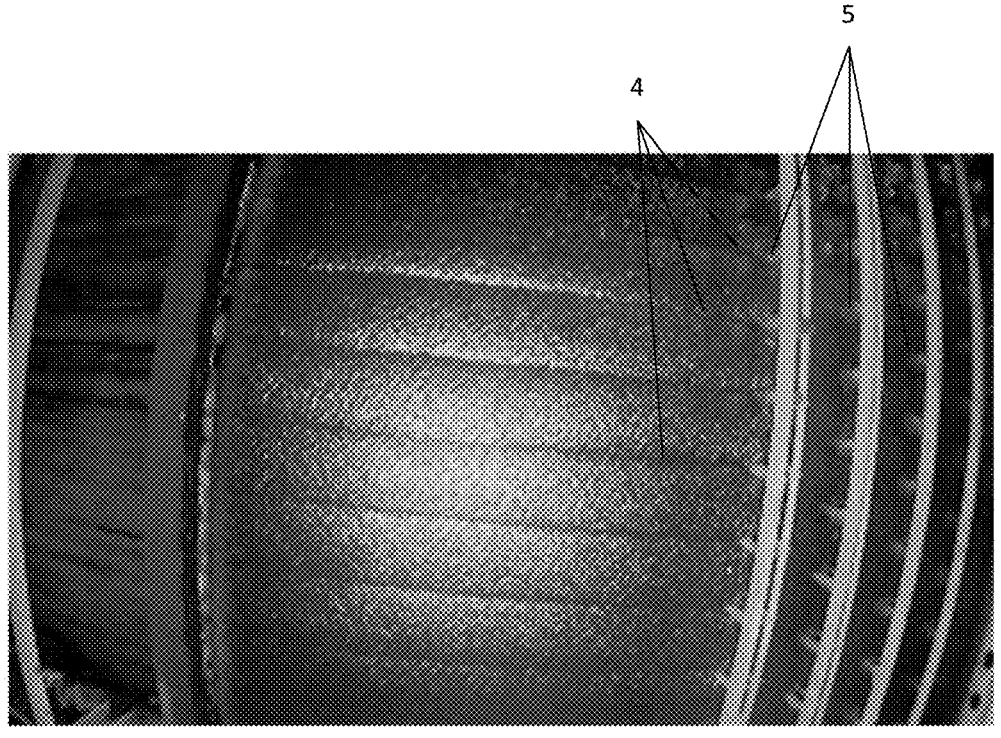
FIGS. 2A and 2B show differently dewatered sludge in a dewatering device.
Figure 2B:
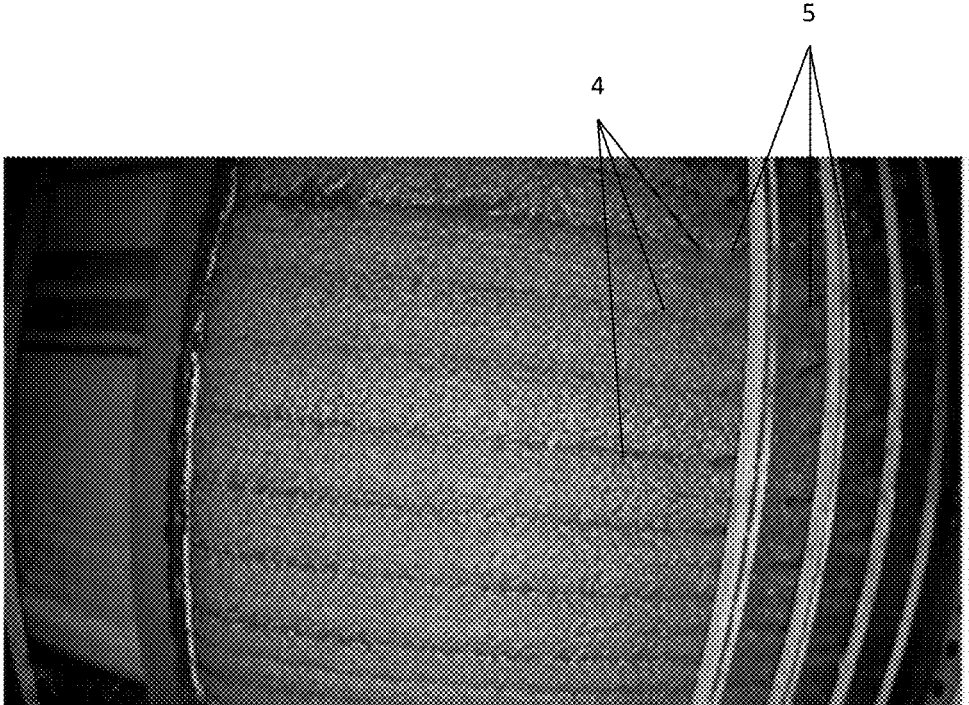

FIGS. 2A and 2B show differently dewatered sludge in a dewatering device, whereby FIG. 2A shows too little and FIG. 2B too much dewatering or flocculant dosage. As shown in FIG. 2A, too little flocculant will result in smooth, mirror-like textures, while too much flocculant, as shown in FIG. 2B, will result in coarse, matt textures. The trained computational model classifies the sub-images 3 and thus allows the assessment of the dewatering of the sludge. Unexpectedly, images of dewatered sludge comprising a boundary surface 4 of the dewatering device, in particular a free wire surface of a wire 6 on which the sludge is guided, for example in an edge region of the wire 6 or in the wake after a barrier 5 acting on a wire 6, which is in direct contact with the sludge, have a particularly distinctive surface texture, in particular granulation, relief or cracks. The evaluation of these images is therefore advantageous and more meaningful. FIGS. 2A and 2B clearly show the barriers 5 acting on a wire 6. In the wake after the barriers 5, the boundary surfaces 4 or the wire 6 are exposed, whereby the dewatered sludge in the vicinity of the boundary surfaces 4 forms the particularly distinctive surface texture.

Figure 3A:
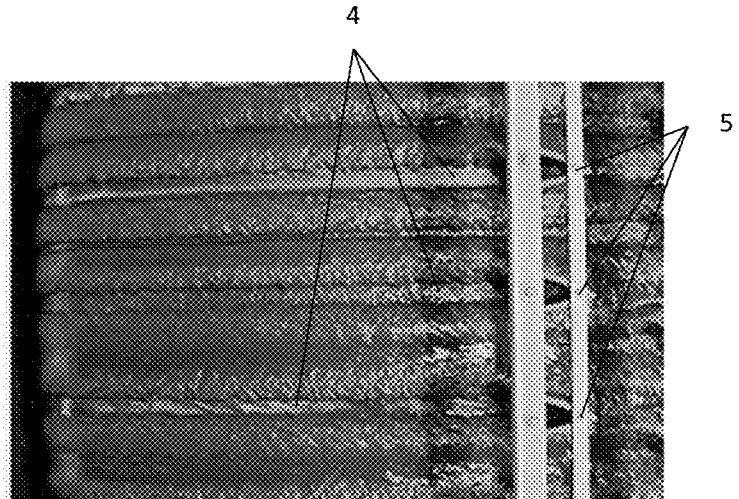
FIGS. 3A-3C show further examples of a differently dewatered sludge in a dewatering device.
Figure 3B:
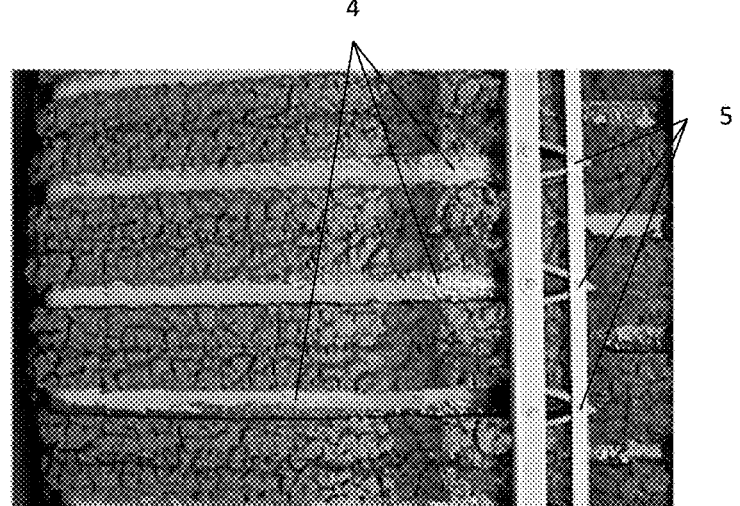
Figure 3C:
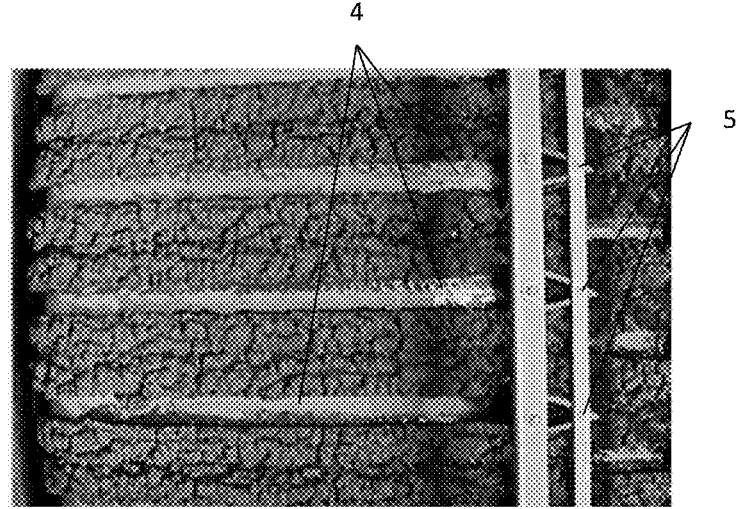

FIGS. 3A-3C show further examples of differently dewatered sludge in a dewatering device, whereby FIG. 3A shows too little, FIG. 3B an optimal and FIG. 3C too much dewatering or flocculant dosage. FIG. 3A with too little flocculant dosage leads to smooth mirror-like structures, whereby no distinctive surface texture, granulation or relief is given. FIG. 3B with optimal flocculant dosage leads to the distinctive surface texture, granulation, or relief, which in the example is accompanied by optimum dewatering. FIG. 3C with too much flocculant added results in even coarser, matt textures, indicating a flocculant overdose. The subdivision of the images or training images is done in such a way that the sub-images or training sub-images have the smallest possible size, whereby the size of the training sub-images is chosen at least large enough so that the sub-images reproduce the surface texture, in particular the granulation, the relief or cracks of the dewatered sludge. This instruction for the professional is easy to understand with the help of FIGS. 3A-3C. As FIG. 3A does not show a distinctive texture, the assessment of whether a subdivision has been appropriately chosen cannot be made on the basis of FIG. 3A. FIG. 3B and FIG. 3C, on the other hand, show a very distinctive texture, granulation, and relief, respectively. The size of the sub-image is chosen to be as small as possible, whereby the distinctive texture, granulation, relief, or crack is necessarily still recognisable on the sub-image. It should also be noted that images of dewatered sludge, comprising a boundary surface 4 of the dewatering device, in particular a free wire surface of a wire 6 on which the sludge is guided, for example in the wake after a barrier 5 acting on a wire 6, which is in direct contact with the sludge, have a particularly distinctive surface texture, in particular granulation, relief or cracks. In FIGS. 3A-3C, the barriers 5 can be seen acting on the wire 6, exposing the boundary surfaces 4 and the wire 6, respectively.

Figure 4:
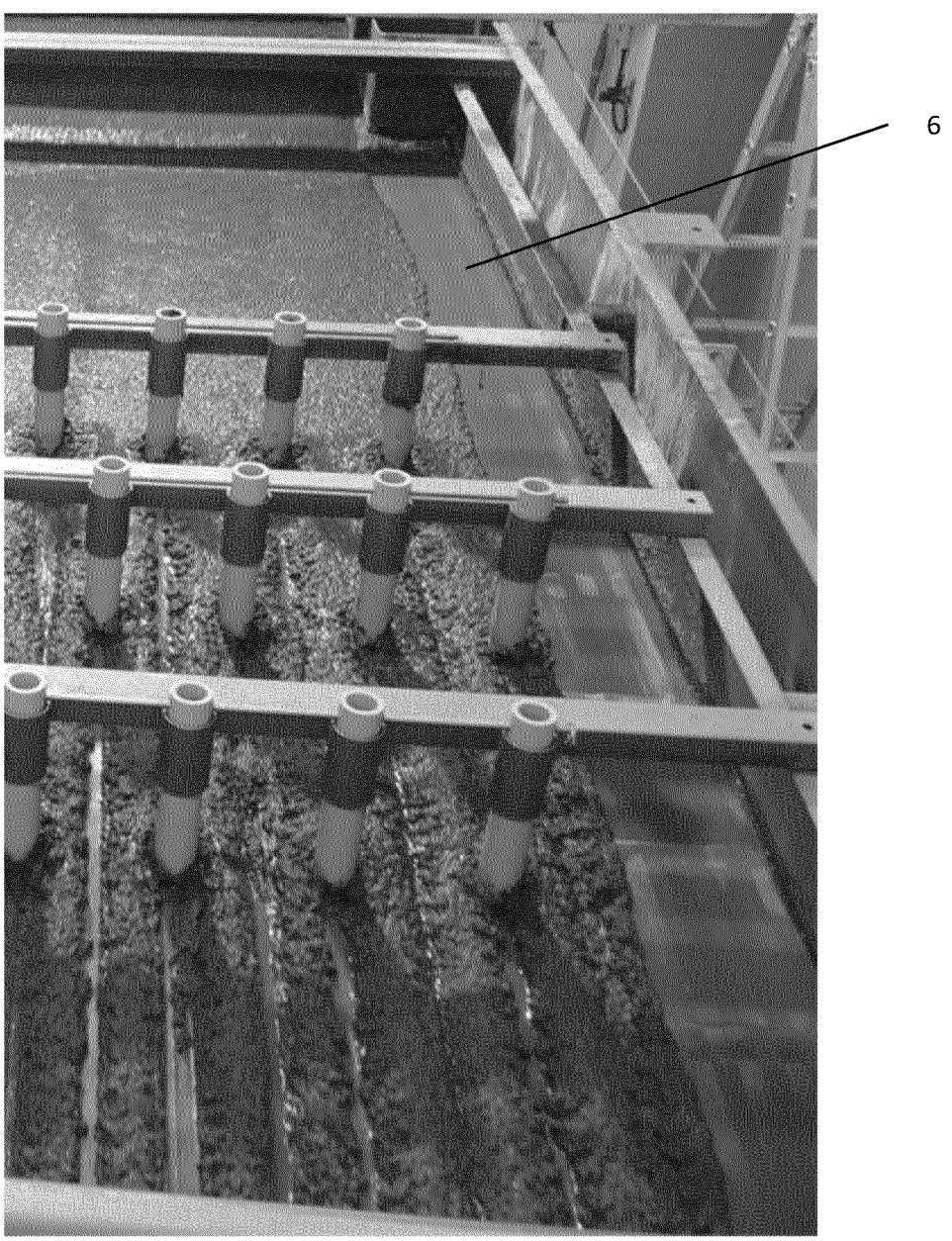
FIG. 4 shows an area in a dewatering device with dewatered sludge and formed boundary surfaces.

FIG. 4 shows an area in a dewatering device 1 with dewatered sludge and formed boundary surfaces. In this case, the dewatered sludge is guided on a wire 6, with barriers 5 acting on the wire 6, which leads to the formation of distinctive surface textures in the sludge in the wake after the barriers 5. Images 2, which include a boundary surface 4, thus allow a particularly advantageous or meaningful evaluation of the sub-images 3.

Figure 5A:
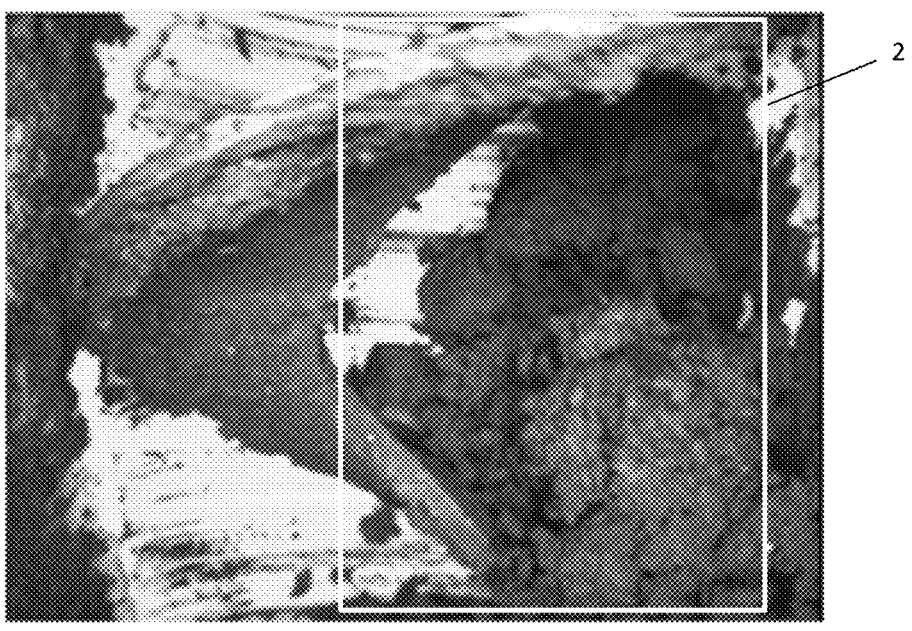
FIGS. 5A and 5B show an image or sub-images of dewatered sludge in another dewatering device.
Figure 5B:
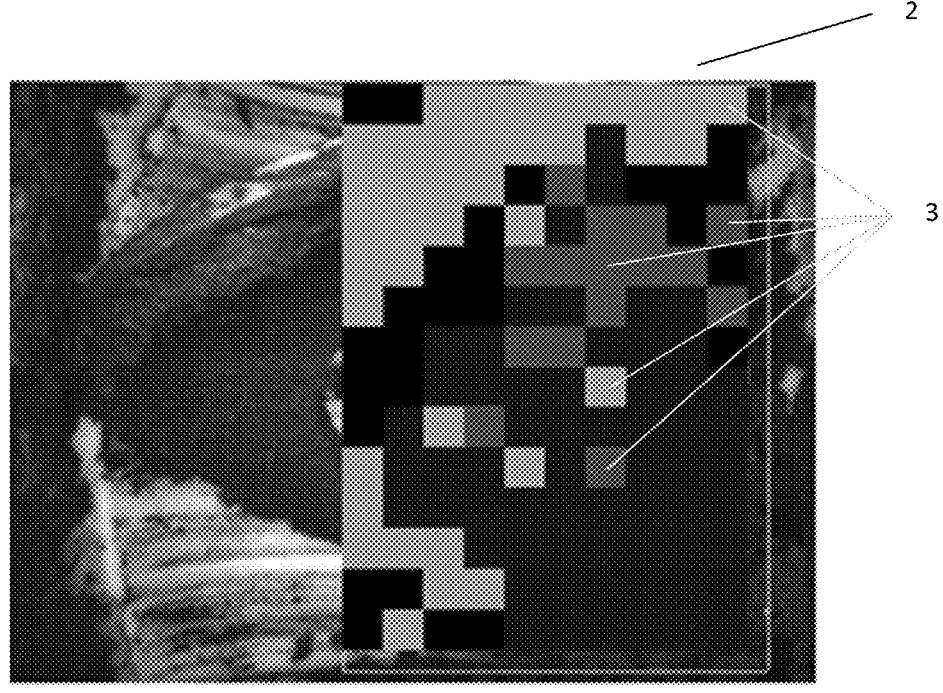

FIG. 5A shows image 2 and FIG. 5B shows image 2 and sub-images 3 of dewatered sludge. The dewatered sludge is transported through a screw conveyor. In FIG. 5A, the white frame indicates the image 2 captured by the camera system. FIG. 5B shows the image 2 subdivided into sub-images 3 by the computational model, whereby the sub-images 3 are classified by the trained computational model and the class assigned to each sub-image is indicated by the colouring of the sub-image 3 or the square 3. Advantageously, the classification includes a class for the detection of invalid sub-images 3, which are not included in the assessment of the dewatering of the sludge. In this case, sub-images are considered invalid if no dewatered sludge is shown on the sub-images, but elements of the dewatering device are shown. In FIG. 5A or 5B, for example, the screw conveyor can be clearly seen in FIG. 2 next to the dewatered sludge.

The herein disclosed embodiments numerous advantages. They allow effective and objective control of the flocculant dosage to a sludge, achieving optimum dewatering with the least amount of flocculant, which is ecologically as well as economically relevant. The disclosed method allows a quick and easy training of the computational model, which makes the method applicable to the dewatering of a wide variety of sludges. In particular, the subdivision of the images into sub-images, where the assessment of the sub-images is done by the computer-implemented computational model. On the one hand, this allows the computational model to be trained with comparably few training images. On the other hand, the evaluation of the sub-images is faster and less computationally intensive—compared to an evaluation based on individual images. If the images are taken in areas that include not only the dewatered sludge or dewatered liquid but also boundary surfaces, the evaluation of the corresponding sub-images shows a further increase in significance.

REFERENCE NUMERALS (1) Dewatering device
(2) Image
(3) Sub-image
(4) Boundary surface
(5) Barrier
(6) Wire

The invention claimed is:

1. A method for controlling addition of a flocculant to a sludge, wherein
the flocculant is added to the sludge and the sludge is subsequently at least partially dewatered in a dewatering device (1),
individual images (2) of the dewatered sludge or the liquid dewatered from the sludge are produced with a camera system and thereafter evaluated with a computer-implemented computational model for image analysis, the computer-implemented computational model being previously trained with a training data set comprising individual training images of dewatered sludge or liquid dewatered from the sludge, wherein:
the computer-implemented computational model for image analysis is formed as artificial neural network;

the training data set further comprises training sub-images (3) formed from individual training images by a subdivision and classification of the individual training sub-images (3),
a size of the training sub-images (3) is reduced from an original size for subdividing the training images,
the size of the training sub-images (3) is selected at least large enough that the training sub-images (3) allow conclusions to be drawn about the surface texture of the dewatered sludge or liquid dewatered from the sludge,
the computational model divides the individual images (2) into sub-images (3) analogously to the subdivision of the training images into training sub-images, comprising:
classifying the sub-images (3) of the individual image (2), using the computational model to classify the sub-images (3) of the dewatered sludge according to a surface texture of the dewatered sludge,
assessing the dewatering of the sludge on the basis of the classification of the sub-images (3), and
controlling the flocculant dosage on the basis of the assessment of the dewatering of the sludge.

2. The method according to claim 1, wherein the surface texture of the dewatered sludge includes one or more of granulation, a relief or cracks in the dewatered sludge.

3. The method according to claim 1, wherein the surface texture of the dewatered liquid includes one or more of bubbles and foam formation.

4. The method according to claim 1, wherein the computational model classifies the sub-images (3) of the liquid dewatered from the sludge according to one or more of presence, absence and quantity of bubbles trapped in the liquid or a foam formed on the liquid.

5. The method according to claim 4, wherein the computational model classifies the sub-images (3) according to color properties selected from one or more of a color value, a color saturation and a brightness value.

6. The method according to claim 1, wherein the computational model classifies the sub-images (3) according to color properties selected from one or more of a color value, a color saturation and a brightness value.

7. The method according to claim 6, wherein the classification of the sub-images (3) comprises at least two classes including:
a first class representing too little dewatering or flocculant dosage, and
a second class representing too much dewatering or flocculant dosage.

8. The method according to claim 1, wherein the classification of the sub-images (3) comprises at least two classes including:
a first class representing too little dewatering or flocculant dosage, and
a second class representing too much dewatering or flocculant dosage.

9. The method according to claim 8, wherein the classification of the sub-images (3) comprises at least a third class representing satisfactory dewatering or flocculant dosage.

10. The method according to claim 9, wherein a distribution of the frequency of the classes of the sub-images (3) of the image (2) is used to assess the dewatering of the sludge.

11. The method according to claim 9, comprising a further class including detection of invalid sub-images (3).

12. The method according to claim 8, wherein a distribution of the frequency of the classes of the sub-images (3) of the image (2) is used to assess the dewatering of the sludge.

13. The method according to claim 8, comprising a further class including detection of invalid sub-images (3).

14. The method according to claim 8, wherein a desired dewatering or flocculant dosage is intentionally set to create the training data set and the training images (2) of the dewatered sludge or dewatered liquid or both are classified as representing satisfactory dewatering or flocculant dosage.

15. The method according to claim 1, wherein a desired dewatering or flocculant dosage is intentionally set to create the training data set and the training images (2) of the dewatered sludge or dewatered liquid or both are classified as representing satisfactory dewatering or flocculant dosage.

16. The method according to claim 1, wherein too little or too much dewatering or flocculant dosage is intentionally set to create the training data set and the training images (2) of the thus dewatered sludge or dewatered liquid or both are classified as representing too little or too much dewatering or flocculant dosage, respectively.

17. The method according to claim 1, wherein the images (2) of the dewatered sludge or dewatered liquid are made in an area comprising a boundary surface (4) selected from one or more of a free wire surface of a wire on which the sludge is guided, a free surface of a dewatering or conveying screw or a wall which is in direct contact with the sludge or the dewatered liquid.

18. A dewatering device (1) for sludge for performing the method according to claim 1, comprising:

a camera system for producing images of the dewatered sludge or the liquid dewatered from the sludge, a control system for controlling the addition of a flocculant to the sludge, and a computer arranged to execute the computational model for the image analysis.

19. The device according to claim 18, wherein the camera system comprises a digital camera and illuminating means, the digital camera is associated with an optical axis, and the illuminating means are configured for illumination in the direction of the optical axis.

20. A computer program product, comprising instructions for causing the device of claim 18 to perform the method of claim 1.

\* \* \* \* \*